(12) United States Patent
Kataoka et al.

(10) Patent No.: US 6,749,881 B2
(45) Date of Patent: *Jun. 15, 2004

(54) PACKAGED EMULSIFIED BEVERAGE

(75) Inventors: Kiyoshi Kataoka, Tokyo (JP); Naoki Hosoya, Tokyo (JP); Eiichi Hoshino, Tokyo (JP); Yoshikazu Ogura, Tokyo (JP)

(73) Assignee: Kao Corporation, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 10/101,606

(22) Filed: Mar. 21, 2002

(65) Prior Publication Data

US 2003/0044504 A1 Mar. 6, 2003

(30) Foreign Application Priority Data

Mar. 26, 2001 (JP) .......................................... 2001-087241
Jan. 17, 2002 (JP) .......................................... 2002-008884

(51) Int. Cl.$^7$ .............................................. A23C 9/152
(52) U.S. Cl. ..................... 426/590; 426/580; 426/594; 426/597; 426/654; 426/662; 426/106
(58) Field of Search ................................ 426/590, 580, 426/594, 597, 654, 662, 106

(56) References Cited

U.S. PATENT DOCUMENTS

| 5,160,759 A | 11/1992 | Nomura et al. |
| 5,200,226 A | 4/1993 | Sanchez Rodriguez |
| 5,202,145 A | 4/1993 | Wisler et al. |
| 5,209,157 A | 5/1993 | Sanchez Rodriguez |
| 5,260,085 A | 11/1993 | Wisler et al. |
| 5,962,058 A | 10/1999 | Ono et al. |
| 6,337,414 B1 | 1/2002 | Sugiura et al. |
| 6,361,980 B2 | 3/2002 | Sugiura et al. |

FOREIGN PATENT DOCUMENTS

| JP | 55-159753 | | 12/1980 |
| JP | 59-91845 | | 5/1984 |
| JP | 63-104917 | | 5/1988 |
| JP | 63-226244 | | 9/1988 |
| JP | 3-8431 | | 1/1991 |
| JP | 3-277260 | | 12/1991 |
| JP | 4-222553 | | 8/1992 |
| JP | 5-176677 | | 7/1993 |
| JP | 6-169735 | * | 6/1994 |
| JP | 8-23941 | | 1/1996 |
| JP | 11-113492 | | 4/1999 |

* cited by examiner

Primary Examiner—Anthony Weier
(74) Attorney, Agent, or Firm—Oblon, Spivak, McClelland, Maier & Neustadt, P.C.

(57) ABSTRACT

Provided is a packaged emulsified beverage having (A) a diglyceride having, as a fatty acid constituent thereof, 15 to 90 wt. % of an ω3-unsaturated fatty acid and (B): a lipid selected from phospholipids and lypoproteins. The packaged emulsified beverage according to the present invention maintains good taste even after sterilization and at the same time is excellent in long shelf life.

19 Claims, No Drawings

PACKAGED EMULSIFIED BEVERAGE

BACKGROUND OF THE INVENTION

1. Field of the Invention

The present invention relates to emulsified beverages which have been filled in airtight storage packages such as PET bottles, cans, drink boxes, paper packages or airtight plastic cups; and which exhibit excellent emulsion stability over a long period of time and maintain good taste even if sold under heating in a vending machine or at storefront, at ordinary temperatures, or under cooling.

2. Discussion of the Background

Emulsified beverages such as milk coffee, milk tea and cocoa usually contain animal fat originated from milk. In recent days, there has been an attempt to replace the animal fat in such drinks with a vegetable fat with a view toward lowering the blood cholesterol level (Japanese Patent Laid-Open Nos. 222553/1992 and 159753/1980).

On the other hand, diglyceride-containing beverages are reported because they are physiologically effective for lowering the neutral fat level in the blood and suppressing body fat accumulation (Japanese Patent Laid-Open Nos. 23941/1996 and 104917/1988).

For effective exhibition of such physiological effects of diglycerides, an increase in their content is desired and intake of them in the beverage form is preferred from the viewpoints of palatability and easy intake.

Incorporation of a large amount of diglycerides in coffee, tea or the like beverage is however accompanied with such a problem that the taste which is the sole merit of such a beverage is impaired rightly after preparation. In particular, sterilization, for example, by heating is indispensable for preparation of a packaged beverage but it causes a marked deterioration in taste. Incorporation of diglycerides in a beverage causes unsatisfactory emulsification or dispersion, though depending on their amount, and tends to deteriorate the appearance or taste of the beverage with the passage of time, for example, a creaming or separating phenomenon between oil phase and aqueous phase occurs during storage or an increase in the size of the emulsified and dispersed particles or precipitation of a solid occurs. Such a change in taste or appearance has posed a severe problem for sales of a packaged diglyceride-containing beverage on the market.

An object of the present invention is therefore to provide a packaged emulsified beverage which contains a large amount of diglycerides, and in spite of a high content, has good taste rightly after preparation even if it has been sterilized and exhibits stable appearance and taste even after long storage.

SUMMARY OF THE INVENTION

The present inventors have therefore prepared packaged emulsified beverages by adding various components to diglycerides and investigated their taste and stability. As a result, it has been found that a packaged emulsified beverage containing, in combination, a diglyceride having a specific fatty acid constitution and a phospholipid or lipoprotein has good taste even after sterilization by heating and exhibits stable appearance and taste even after storage over long hours.

In the present invention, there is thus provided a packaged emulsified beverage comprising the following components (A) and (B):

(A): a diglyceride, having in the fatty acid constituents thereof, 15 to 90 wt. % of an ω-3 unsaturated fatty acid; and (B) a lipid selected from the group consisting of phospholipids, lipoproteins and a mixture thereof.

The packaged emulsified beverage according to the present invention has good taste even after sterilization and is excellent in long shelf life.

DETAILED DESCRIPTION OF THE INVENTION

Within the context of the present invention, the term "packaged emulsified beverage" as used herein means an emulsified beverage hermetically sealed in a beverage package without dilution.

The diglyceride serving as Component (A) in the present invention contains, in the fatty acid constituents thereof, an ω3 unsaturated fatty acid in an amount of 1.5 to 90 wt. %, preferably 40 to 75 wt. %, especially 40 to 60 wt. %. Within the above-described ranges, the resulting beverage can exhibit excellent physiological effects which the diglyceride originally has such as neural lipid lowering effects and body fat accumulation resisting effects, and at the same time has emulsion stability and good taste.

The term "ω3 unsaturated fatty acid" as used herein means an unsaturated fatty acid having, at the third carbon atom from the ω position thereof, a first unsaturated bond and having at least two unsaturated bonds. Of such ω3 unsaturated fatty acids, those having 12 to 24 carbon atoms are preferred, with α-linolenic acid, docosahexaenoic acid and eicosapentaenoic acid being more preferred. As the ω3 unsaturated fatty acid, α-linolenic acid is especially preferred. Although the diglyceride separated and purified from an oil/fat may be added, an oil/fat containing the diglyceride is usually added to the beverage.

The above-described oil/fat containing the diglyceride serving as Component (A) is available by conventional methods known to those of ordinary skill in the art without undue experimentation, such as by any one of hydrolysis reaction of a linseed coil, perilla oil, soybean oil or rapeseed oil containing an ω3-unsaturated acyl group, ester exchange reaction of the above-exemplified oil/fat with glycerin, or esterification of a fatty acid derived from such an oil/fat with glycerin. The reacting method may be either one of chemical reaction in the presence of an alkali catalyst or biochemical reaction using an enzyme, which may be immobilized, such as lipase. The resulting oil/fat composition containing the diglyceride may be added with a vegetable oil such as soybean oil, rapeseed oil, palm oil, rice oil or corn oil, or an animal oil such as beef tallow or fish oil; or hydrogenated, fractionated or random ester exchange oil thereof to adjust the content of the diglyceride, monoglyceride, triglyceride and/or free fatty acid in the composition.

It is preferred that from the viewpoint of emulsion stability, the unsaturated fatty acids amount to at least 50 wt. %, more preferably at least 60 wt. %, especially at least 70 wt. % of all the fatty acid constituents of Component (A). The term "unsaturated fatty acids" as used herein embraces not only ω3 but also ω9 and ω6 ones. The unsaturated fatty acids have preferably 12 to 24 carbon atoms, especially 12 to 22 carbon atoms.

The amount of the diglyceride serving as Component (A) is preferably 30 wt. % or greater, more preferably 40 wt. % or greater in the whole oil/fat contained in the emulsified beverage of the present invention. Within the above-described ranges, taste with less greasiness is available.

From the viewpoint of body fat reducing effects, preferred are Component-(A)-containing oils/fats having 0.1 to 74.9 wt. % of triglycerides, 25 to 95 wt. % of diglycerides and 0.1 to 5 wt. % of monoglycerides are preferred, of which those having 5 to 59.9 wt. % of triglycerides, 25 to 90 wt. % of diglycerides and 0.1 to 5 wt. % of monoglycerides are more preferred, with those having 5 to 49.9 wt. % of triglycerides, 50 to 90 wt. % of diglycerides and 0.1 to 5 wt. % of monoglycerides being especially preferred.

When the emulsified beverage is a processed milk product, the diglyceride content in the oil/fat is preferably reduced to 30 wt. % or less in order to supplement triglycerides as a nutrient.

It is preferred to incorporate, in the packaged emulsified beverage of the invention, Component (A) in an amount of 0.1 to 8 wt. %, more preferably 0.1 to 5 wt. %, especially 0.2 to 5 wt. %, still more preferably 0.2 to 2 wt. %. Within the above-described ranges, the emulsified beverage after retort sterilization or UHT sterilization has high emulsion stability while maintaining good taste. Particularly when it is incorporated in a processed milk product, a weight ratio of Component (A) to milk fat preferably falls within a range of 10:90 to 40:60, more preferably 10:90 to 35:65, especially 10:90 to 30:70. Within the above-described ranges, the resulting beverage becomes smooth to drink and is therefore preferred. When the Component-(A)-containing oil/fat is added to the emulsified beverage, its amount is preferably 0.1 to 10 wt. %, more preferably 0.1 to 8 wt. %, especially 0.1 to 6 wt. % from the viewpoint of emulsion stability.

Examples of the phospholipid serving as Component (B) to be used in the present invention include phosphoric-acid-containing-lipids such as (1) diglyceride-3-phosphoric acid (phosphatidic acid) and derivatives thereof, and monoglyceride-3-phosphoric acid (lysophosphatidic acid) and derivatives thereof, (2) ceramide-1-phosphoric acid (ceramidephosphoric acid) and derivatives thereof, and (3) mixtures containing at least one of the compounds (2) as a constituent.

Specific examples of (1) include phosphatidylcholine, phosphatidylserine, phoaphatidylinositol, phosphatidylethanolamine, phosphatidyl-N-methylethanolamine, and phosphatidyl-N,N-dimethylethanolamine and these components in the lyso form.

Specific examples of (2) include sphingomyelin, ceramide phosphorylethanolamine and ceramide phosphoryl glycerol.

Specific examples of (3) include lecithin and lysolecithin purified from soybean or egg yolk.

The lipoprotein as Component (B) is a complex between a lipid and a protein. As the lipoprotein, a complex between a phospholipid and a protein is more preferred. The lipoprotein is available by mixing a phospholipid such as soybean lecithin or yolk lecithin with a protein such as milk protein or soybean protein and then kneading or lyophilizing the mixture.

As Component (B), lecithin, lysolecithin and lipoprotein are preferred, of which lecithin and lysolecithin are more preferred, with lecithin being especially preferred. A mixture of at least two of them may be used. Alternatively, a food (milk, soybean milk, etc.) containing phospholipid and/or lipoprotein may be used as Component (B).

From the viewpoint of emulsion stability, it is preferred to add Component (B) in an amount of 0.01 to 0.5 wt. %, more preferably 0.02 to 0.4 wt. % in the packaged emulsified beverage of the present invention.

The smaller a ratio of the average particle size, in the oil/fat in the emulsified beverage, after sterilization to that before sterilization [(after sterilization/before sterilization)× 100], the better, because when the ratio is smaller, the taste of the beverage is not impaired even by the long-term storage after sterilization. The ratio of 150 or less, more preferably 130 or less, especially 115 or less is preferred.

The average particle size in the oil/fat in the emulsified beverage is a value measured by laser diffraction, for example, by a particle size distribution analyzer ("SALD-2100 MD ", trade name; manufactured by Shimadzu Corporation). The oil/fat in the form of fine particles having an average particle size of 1 $\mu$m or less is preferred, because at such a particle size range, the resulting beverage is palatable and smooth to drink.

The packaged emulsified beverage of the present invention preferably contains, in addition to Components (A) and (B), a milk component. Examples of the milk component include milk, sterilized milk, skim milk powder, whole milk powder, concentrated milk, condensed milk, casein, milk whey protein and milk whey mineral.

In the packaged emulsified beverage of the present invention, it is possible to incorporate a sweetener, acidifier, inorganic acid, inorganic acid salt, organic acid and/or organic acid salt as needed. Examples of the sweetener include sucrose, glucose, fructose, isomerized liquid sugar, glycyrrhizin, stevia, aspartame, fructo-oligosaccharide, galacto-oligosaccharide, malt syrup, erythritol, suclarose, maltose, sorbitol and saccharin sodium. An artificial sweetener such as Acesulfame K is also usable. The above-exemplified sweetener is preferably added in an amount of 0 to 60 wt. %, especially 0 to 20 wt. % in the emulsified beverage.

Examples of the acidifier include, as well as juices extracted from natural components, citric acid, tartaric acid, malic acid, lactic acid, fumaric acid and gluconic acid. The acidifier is preferably added in an amount of 0 to 10 wt. %, more preferably 0 to 5 wt. % to the emulsified beverage.

Examples of the inorganic acid or salt thereof include phosphoric acid, sodium phosphate, sodium metaphosphate, sodium polyphosphate arid sodium bicarbonate, while those of the organic acid or salt thereof include citric acid, succinic acid, itaconic acid, malic acid, sodium citrate and gluconic acid. These acids are preferably added in an amount of 0 to 10 wt. %, more preferably 0 to 5 wt. % in the emulsified beverage.

To the above-described components, it is possible to add, as desired, vitamins such as sodium ascorbate, carragenan, dextrin, cyclodextrin, antioxidants, flavors, colorants, preservatives, seasonings, juice extracts, vegetable extracts, nectar extracts, pH regulators and quality stabilizers. Water, carbonated water, coffee bean extract or black tea extract may be incorporated if necessary.

The packaged emulsified beverage of the present invention is preferably an emulsion type beverage such as processed milk product, milk coffee, cocoa, milk shake, milk tea or soup, of which milk tea, milk coffee or processed milk product is preferred.

The pH of the packaged emulsified beverage of the present invention is preferably 3 to 8, more preferably 4 to 7.5, especially 5 to 7 at 25°C. Such pH ranges are sufficient for preventing aggregation of oil/fat globules, creaming and oil-off.

Examples of the package to be used for the packaged emulsified beverage of the present invention include molded or formed packages composed mainly of polyethylene terephthalate (so-called PET bottle), metal cans, paper packages lined with a metal foil or plastic film, bottles and cups to be hermetically sealed.

The packaged emulsified beverage of the present invention can be prepared, for example, by filling an emulsified beverage in a package such as metal can and then sterilizing the packaged emulsified beverage under conditions as prescribed by Food Sanitation Law. If the package is not suited for retort sterilization, for example, PET bottle, paper pack or hermetically-sealing type plastic cup, employed is a method of sterilizing the package at high temperatures in a short time under sterilizing conditions similar to the above-described ones, for example, by using a plate type heat exchanger, cooling it to a predetermined temperature and then, filling the emulsified beverage therein. Alternatively, it is possible to fill a portion of the components in a package, sterilize the resulting package and then aseptically fill the remaining portion of the components, which has been sterilized separately, in the package.

Having generally described this invention, a further understanding can be obtained by reference to certain specific examples which are provided herein for purposes of illustration only and are not intended to be limiting unless otherwise specified.

EXAMPLES

Preparation Example of an Oil/Fat

"Lypozyme IM" (trade name; product of Novo Nordisk Bioindustry) was added to 650 parts by weight of linseed oil fatty acid and 107 parts by weight of glycerin and they were esterified at 40° C. for 5 hours at 0.07 hPa. After molecular distillation (at 215° C., 0.07 hPa), the residue was decolored, washed with water, and then deodorized at 215° C. for 2 hours, whereby an oil/fat α was obtained.

Compositions of the oil/fat α and oil/fat β (natural cod oil) used in Examples are shown in Table 1.

TABLE 1

| | | (wt. %) | |
|---|---|---|---|
| Raw material oil/fat | | Oil/fat α Linseed oil | Oil/fat β Cod oil |
| Oil/fat | Triglycerides | 16.4 | 99.0 |
| | Diglycerides | 83.3 | 0.8 |
| | Monoglycerides | 0.2 | 0.1 |
| | Free fatty acids | 0.1 | 0.1 |
| Diglyceride-constituting fatty acids | C18:3 (ω3) | 61.6 | 0.1 |
| | C18:1 | 13.8 | 14.1 |
| | C20:1 | | 3.2 |
| | C22:1 | 0.1 | 1.1 |
| | C18:2 | 17.4 | 0.6 |
| | C16:0 | 5.6 | 19.8 |
| | C18:0 | 1.5 | 4.0 |
| | C14:0 | | 1.5 |
| | C16:1 | | 3.7 |
| | C18:4 (ω3) | | 0.5 |
| | C20:4 | | 2.7 |
| | C20:5 (ω3) | | 17.2 |
| | C22:5 (ω3) | | 1.5 |
| | C22:6 (ω3) | | 30.0 |
| Triglyceride-constituting fatty acids | C18:3 (ω3) | 61.7 | 0.1 |
| | C18:1 | 13.9 | 14.0 |
| | C20:1 | 0.1 | 3.0 |
| | C22:1 | 0.1 | 1.1 |
| | C18:2 | 17.6 | 0.6 |
| | C16:0 | 5.5 | 20.1 |
| | C18:0 | 1.1 | 4.1 |
| | C14:0 | | 1.5 |
| | C16:1 | | 3.8 |
| | C18:4 (ω3) | | 0.6 |
| | C20:4 | | 2.8 |
| | C20:5 (ω3) | | 17.0 |
| | C22:5 (ω3) | | 1.5 |
| | C22:6 (ω3) | | 29.8 |

Example 1

Packaged emulsified beverages having the compositions as shown in Table 2 were prepared, respectively.

TABLE 2

| | | (wt. %) | |
|---|---|---|---|
| | | Invention product 1 | Comparative product 1 |
| Oil/fat | | 1.2 | 1.2 |
| Lysolecithin [1] | | 0.03 | — |
| Skim milk [2] | | 2.9 | 2.9 |
| Sterilized milk [3] | | 67.0 | 67.0 |
| Sucrose fatty acid ester [4] | | 0.1 | 0.1 |
| Flavor | | q.s. | q.s. |
| Water | | Balance | Balance |
| pH (25° C.) | | 6.8 | 6.8 |
| Average particle size (μm) | (a) Before retort sterilization | 0.61 | 0.61 |
| | (b) After retort sterilization | 0.70 | 1.11 |
| ((b)/(a)) × 100 | | 115 | 182 |
| Stored for 2 months at 37° C. after UHT sterilization | Appearance (oil-off) | Not observed | Observed |
| | Taste | A | C |

[1] "SUNLECITHIN A" (trade name; product of Taiyo Kagaku Co., Ltd.)
[2] product of Yotsuba Nyugyu Co., Ltd.
[3] product of Kyodo Milk Industry Go., Ltd..
[4] "P-1670" (trade name; product of Mitsubishi Chemical Corporation)

Sterilizing Conditions

Retort sterilization: Each beverage was heat treated at 125° C. for 25 minutes by using a retort sterilization tester ("PK-3030", trade name; product of Alp Co., Ltd.) under conditions to give an F value (sterilization index) of 40. Treatment at the F value of 3.1 can destroy Botulinus bacilli.

UHT sterilization: UHT sterilization was conducted at 140° C. for 30 seconds by steam injection by using a test sterilizer ("B2131", trade name; product of Hisaka Works, Ltd.).

The average particle size ratio ((b)/(a)×100) of the oil droplet of the emulsified beverage after retort sterilization to that before retort sterilization revealed that a change in the average particle size of Invention product was as small as 115. The emulsified beverages subjected to UFIT sterilization were filled in a PET bottle and stored at 37° C. for 2 months. The oil-off was not visually observed from Invention Product 1, while it was observed from Comparative Product 1. The taste was evaluated by a panel of 10 tasting experts in accordance with the following standard scores:

Evaluation Scores

5: Superior in taste

4: Slightly superior in taste

3: Neither superior nor inferior in taste

2: Slightly inferior in taste

1: Inferior in taste

Taste evaluation

A: 4.0 or greater on average

B: 2.1 to 3.9 on average

C: 2.0 or less on average

Example 2

An emulsified beverage filled in a PET bottle was prepared to have the composition as shown in Table 3. The beverage was aseptically filled in the PET bottle after UHT sterilization.

TABLE 3

(wt. %)

| | Invention products | | | Comparative products | |
|---|---|---|---|---|---|
| | 2 | 3 | 4 | 2 | 3 |
| Oil/fat α | 1.2 | 1.2 | 1.2 | 1.2 | — |
| Oil/fat β | — | — | — | — | 1.2 |
| Soybean lecithin[1] | 0.057 | — | — | — | — |
| Lysolecithin[2] | — | 0.3 | — | — | — |
| Lipoprotein[3] | — | — | 0.2 | — | — |
| Skim milk[2] | 2.9 | 2.9 | 2.9 | 2.9 | 2.9 |
| Sterilized milk[2] | 67.0 | 67.0 | 67.0 | 67.0 | 67.0 |
| Sucrose fatty acid ester | 0.1 | 0.1 | 0.1 | 0.1 | 0.1 |
| Flavor[2] | 0.0012 | 0.0012 | 0.0012 | 0.0012 | 0.0012 |
| Water | Balance | Balance | Balance | Balance | Balance |
| pH (25° C.) | 6.8 | 6.8 | 6.8 | 6.8 | 6.8 |
| Average particle size (μm) (a) Before retort sterilization | 0.61 | 0.61 | 0.63 | 0.61 | 0.73 |
| (b) After retort sterilization | 0.64 | 0.70 | 0.71 | 1.11 | 0.89 |
| ((b)/(a)) × 100 | 105 | 115 | 113 | 182 | 122 |
| Taste after storage at 37° C. for 2 months after UHT sterilization | A | A | A | C | B |

[1]"Nisshin Lecithin DX" (product of THE NISSHIN OIL MILLS, LTD.)
[2]Similar to that described in Example 1
[3]Mixture of "Nisshin Lecithin DX" and "Sunlacto N-21" (product of Taiyo Kagaku Col, Ltd.)
Invention Products 2 to 4 maintained good taste even 2 months after storage.

Example 3

Packaged emulsified leverages having the compositions as shown in Table 4 were prepared.

TABLE 4

(wt. %)

| | Invention product 5 | Invention product 6 | Invention product 7 | Invention product 8 |
|---|---|---|---|---|
| Oil/fat α | 0.86 | 1.26 | 0.86 | 1.26 |
| Lysolecithin[1] | 0.15 | 0.15 | — | — |
| Lipoprotein[2] | — | — | 1.0 | 1.0 |
| Skim milk[3] | 1.0 | 0.7 | 1.0 | 0.7 |
| Extract from black tea leaves[4] | 41.1 | — | 41.1 | — |
| Extract from coffee beans[5] | — | 46.0 | — | 46.0 |
| Sucrose | 3.2 | 3.2 | 3.2 | 3.2 |
| Erythritol | 2.4 | 2.4 | 2.4 | 2.4 |
| Suclarose | 0.002 | 0.002 | 0.002 | 0.002 |
| Sodium ascorbate | 0.03 | 0.03 | 0.03 | 0.03 |
| Sodium bicarbonate | 0.02 | 0.02 | 0.02 | 0.02 |
| Sucrose fatty acid ester | 0.03 | 0.1 | 0.03 | 0.1 |
| Flavor | 0.08 | 0.1 | 0.08 | 0.1 |
| Water | 51.128 | 46.038 | 50.278 | 45.188 |
| pH (at 25° C.) | 6.4 | 6.4 | 6.4 | 6.4 |

[1]similar to that used in Example 1
[2]similar to that used in Example 2
[3]similar to that used in Example 3
[4]product of Mitsui Norin Co., Ltd.
[5]product of UNICAFE INC.

Preparation of a Packaged Emulsified Beverage in a Can or PET Bottle

To a coffee-bean extract or black tea extract were added sucrose sodium ascorbate, erythritol, suclarose and sucrose fatty acid ester. The pH of the resulting mixture was adjusted by sodium bicarbonate. The pH-adjusted mixture was then preliminary emulsified while adding thereto the oil/fat α under stirring. After emulsification in a homogenizer, the resulting emulsion as filled in a can or PET bottle. In the case of the canned emulsified beverage, canning was followed by retort sterilization (at 125° C. for 20 minutes), while in the case of the packaged emulsified beverage in a PET bottle, UHT sterilization (at 140° C. for 10 seconds) was followed by aseptic filling.

Invention Products 5 to 8 did not form a cream layer even after storage for 6 months at ordinary temperatures. They were also good in taste according to the evaluation by a panel of 10 tasting experts.

Example 4

A packaged emulsified beverage having the composition as shown in Table 5 was prepared.

TABLE 5

| | (wt. %) Invention Product 9 |
|---|---|
| Oil/fat α | 1.2 |
| Milk[1] | 67.0 |
| Skim milk[2] | 2.7 |
| Soybean lecithin[3] | 0.03 |
| Sucrose fatty acid ester | 0.1 |
| water | 28.97 |
| pH (25° C.) | 6.8 |

[1]product of Kyodo Milk Industry Co.
[2]similar to that employed in Example 1
[3]similar to that employed in Example 2

After emulsification in a similar manner to that employed for Example 3, the emulsified beverage was subjected to UHT sterilization (at 140° C. for 30 seconds), followed by aseptic filling in a drink box, PET bottle and can. Even after storage at ordinary temperatures for 6 months, formation of a cream layer was not observed and in addition, evaluation on taste by a panel of 10 tasting experts resulted in good.
Test (Intake Test by Human)

After intake of 280 mL (milk lipid content: 2.2 g) of a control group milk tea (milk tea without lipid adjustment) as shown in Table 6 for 4 weeks after every supper for the purpose of adjustment, this group was divided into three sub-groups at random with BMI as index. Total calories of the meal other than the milk tea were adjusted to fall within a range of "calories predetermined in consideration of age and intensity of daily activity"±10%.

The intake test was conducted as follows: subjects took meals having similar total calories to those during the adjustment term and after every supper, took 280 mL of the milk tea of each group as described in Table 6 for 16 weeks. During the test term, the amount of the exercise was maintained at the same level with that before the test as possible as they could. At the starting time of the test and every 4 weeks thereafter, body weight and body fat ratio were measured and visceral fat was measured by abdominal, CT scanning.

TABLE 6

| Group | (wt. %) | | |
|---|---|---|---|
| | Control group | Corn oil group | ALA-DAG group |
| ALA-DAG | — | — | 0.86 |
| Corn oil | — | 0.86 | — |
| Milk | 15.0 | 3.0 | 3.0 |
| Black tea extract | 15.0 | 15.0 | 15.0 |
| Sweetened Condensed milk | 3.0 | 3.0 | 3.0 |
| Sucrose fatty acid ester | 0.03 | 0.03 | 0.03 |
| Lysolecithin | — | 0.1 | 0.1 |
| Flavor | 0.1 | 0.1 | 0.1 |
| Sugar | 2.0 | 2.0 | 2.0 |
| Erythritol | 2.4 | 2.4 | 2.4 |
| 10 wt. % aq. soln. of suclarose | 0.02 | 0.02 | 0.02 |
| Na ascorbate | 0.03 | 0.03 | 0.03 |
| 5 wt. % aq. soln. of sodium bicarbonate | 0.25 | 0.25 | 0.25 |
| Deionized water | Balance | Balance | Balance |

(1) ALA-DAG Group (20 Subjects)

An oil/fat (ALA-DAG) was prepared using linseed oil (product of Yoshihara Oil Mill, Ltd.), which had contained an α-linoleic acid at a high concentration, in the presence of immobilized lipase in accordance with the method of Birgitte (JAOCS, 65, 905(1988)). The subjects took 280 mL of milk tea containing 2.4 g of the oil/fat and 1.0 g of milk fat.

(2) Corn Oil Group (13 Subjects)

The subjects took 280 mL of milk tea containing 2.4 g of corn oil and 1.0 g of milk fat.

(3) Control Group (10 Subjects)

The subjects took 280 mL of milk tea containing 2.2 g of milk fat.

The constituent fatty acids of the milk fat, corn oil and ALA-DAG used in the above-described test are as shown in Tables 7 and 8.

TABLE 7

| Triglyceride constituting fatty acids | (wt. %) | |
|---|---|---|
| | Milk fat | Corn oil |
| C14:0 | 10.8 | — |
| C16:0 | 28.4 | 11.2 |
| C18:0 | 11.4 | 2.1 |
| C18:1 | 24.9 | 34.7 |
| C18:2 | 2.7 | 50.5 |
| C18:3 (ω3) | 0.4 | 1.5 |
| C20:1 | 0.2 | — |

TABLE 8

| Oil/fat | | (wt. %) ALA-DAG |
|---|---|---|
| | Diglycerides | 87.0 |
| | Triglycerides | 11.5 |
| | Others | 1.5 |

TABLE 8-continued

| | | (wt. %) ALA-DAG |
|---|---|---|
| Fatty acid constituents of diglycerides | C16:0 | 4.7 |
| | C18:0 | 2.8 |
| | C18:1 | 16.9 |
| | C18:2 | 15.1 |
| | C18:3 (ω3) | 53.4 |
| | C20:0 | 0.1 |
| | C20:1 | 0.1 |
| Fatty acid constituents of all the fatty acids | C16:0 | 5.4 |
| | C18:0 | 3.4 |
| | C18:1 | 19.3 |
| | C18:2 | 15.8 |
| | C18:3 (ω3) | 49.0 |
| | C20:0 | 0.2 |
| | C20:1 | 0.1 |
| | C22:1 | 0.1 |

Measuring Methods

<Measurement of Skinfold Thickness and Body Fat Ratio>

Skinfold thickness was measured at two sites, that is, the midpoint of the extended side of the upper arm and below point of the shoulder blade in the back in accordance with the caliper method by using "Fat-o-meter" manufactured by Takei Scientific Instruments Co., Ltd. Body fat ratio was measured at lower legs lay using "Body composition analyzer TBF-410"(trade name; product of TANITA, Co) and at hands by using "Body fat meter HBF-302" (trade name; product of OMRON CORP)

<Abdominal CT Scanning>

The CT scanning was conducted at the cross-section at the naval part and at a position permitting the spleen and liver to be on the same cross-section. In accordance with the method of Tokunaga, et al., (Int. J. Obes., 7,437 (1983)), the total fat area, visceral fat area and subcutaneous fat area were determined from the CT image. From the latter two areas, a V/S ratio (visceral fat area/subcutaneous fat area) was calculated. in, accordance with the method of Katoh, et al. (Acta hepatologica Japonica, 25, 1097(1984)), a liver/spleen CT ratio was determined. For CT scanning, "TCT-300" and "X Vision RIAL" of Toshiba Medical Systems Co., Ltd. and "PRATICO" of Hitachi Medical Corporation were employed.

The measuring results were indicated by mean±SE. The body composition data were indicated relative to the data at the initiation of the test set at 100. The paired t-test was employed for comparison between the values at the initiation of the test and the values upon measurement in each group. For comparison between groups, t-test was employed.

Measuring results of the body at the starting time of the test before intake of milk tea are shown in Table 9.

TABLE 9

| | Control group | Corn oil group | ALA-DAG group |
|---|---|---|---|
| Age (y) | 39.6 ± 2.8 | 37.0 ± 2.3 | 36.9 ± 1.4 |
| Weight (kg) | 72.4 ± 2.3 | 74.2 ± 2.3 | 71.9 ± 1.4 |
| Height (cm) | 172.5 ± 1.7 | 171.6 ± 1.0 | 170.2 ± 1.0 |
| BMI (kg/m$^2$) | 24.3 ± 0.5 | 25.2 ± 0.7 | 24.9 ± 0.5 |
| Waist circumference (cm) | 85.4 ± 1.4 | 87.6 ± 1.8 | 86.3 ± 1.1 |
| Hip circumference (cm) | 95.7 ± 1.4 | 96.8 ± 1.3 | 96.1 ± 0.8 |
| Waist/Hip ratio | 0.89 ± 0.01 | 0.90 ± 0.01 | 0.90 ± 0.01 |
| Skinfold thickness (mm) | 24.9 ± 1.9 | 30.6 ± 2.5 | 27.1 ± 1.7 |
| Leg fat ratio (%) | 23.4 ± 0.7 | 24.7 ± 1.5 | 24.6 ± 1.1 |
| Hand fat ratio (%) | 23.9 ± 1.0 | 23.0 ± 1.4 | 24.3 ± 1.0 |

TABLE 9-continued

|  | Control group | Corn oil group | ALA-DAG group |
|---|---|---|---|
| Total fat area (cm$^2$) | 225.3 ± 17.4 | 257.2 ± 20.3 | 269.2 ± 12.1 |
| Visceral fat area (cm$^2$) | 86.1 ± 7.9 | 90.3 ± 11.7 | 106.2 ± 6.7 |
| Subcutaneous fat area (cm$^2$) | 139.2 ± 11.8 | 166.9 ± 13.9 | 162.9 ± 9.2 |
| Liver/Spleen CT ratio | 1.11 ± 0.03 | 1.11 ± 0.07 | 1.10 ± 0.04 |

Measuring results 4, 8, 12 and 16 weeks after starting the intake of the milk tea of each group are shown in Tables 10 and 11.

TABLE 10

| Measured | Group | 4 w | 8 w | 12 w | 16 w |
|---|---|---|---|---|---|
| Body weight | Control | 100.0 ± 0.3 | 100.0 ± 0.5 | 99.3 ± 0.7 | 99.2 ± 1.0 |
|  | Corn oil | 99.5 ± 0.3 | 99.6 ± 0.3 | 99.6 ± 0.5 | 99.3 ± 0.6 |
|  | ALA-DAG | 99.6 ± 0.4 | 99.2 ± 0.6 | 98.7 ± 0.7 | 98.3 ± 0.8 |
| BMI | Control | 100 ± 0.3 | 100.0 ± 0.5 | 99.3 ± 0.7 | 99.2 ± 1.0 |
|  | Corn oil | 99.5 ± 0.3 | 99.6 ± 0.3 | 99.6 ± 0.5 | 99.3 ± 0.6 |
|  | ALA-DAG | 99.6 ± 0.4 | 99.2 ± 0.6 | 98.7 ± 0.7 | 98.3 ± 0.8 |
| Leg fat ratio | Control | 98.0 ± 1.4 | 96.8 ± 2.1 | 101.2 ± 2.3 | 104.5 ± 2.3$^\#$ |
|  | Corn oil | 97.7 ± 1.7 | 93.9 ± 2.5$^\#$ | 100.8 ± 1.3 | 101.5 ± 2.3 |
|  | ALA-DAG | 96.9 ± 1.7 | 96.3 ± 1.7$^\#$ | 100.7 ± 1.9 | 101.4 ± 2.0 |
| Hand fat ratio | Control | 96.7 ± 2.6 | 96.6 ± 3.0 | 100.1 ± 3.3 | 100.9 ± 3.4 |
|  | Corn oil | 94.5 ± 2.4$^{\#\$}$ | 94.0 ± 2.8$^\#$ | 98.0 ± 2.4 | 101.3 ± 3.7 |
|  | ALA-DAG | 103.5 ± 8.7 | 96.2 ± 1.8$^\#$ | 98.8 ± 1.8 | 99.2 ± 1.5 |
| Waist circumference | Control | 100.0 ± 0.5 | 99.8 ± 0.6 | 99.8 ± 0.8 | 99.8 ± 0.9 |
|  | Corn oil | 99.3 ± 0.4 | 99.3 ± 0.4 | 99.7 ± 0.5 | 99.7 ± 0.7 |
|  | ALA-DAG | 99.3 ± 0.3$^\#$ | 98.7 ± 0.5$^\#$ | 98.1 ± 0.6$^{\#\#}$ | 98.3 ± 0.7$^\#$ |
| Hip circumference | Control | 101.1 ± 0.4$^{\#*}$ | 100.9 ± 0.5 | 100.4 ± 0.5 | 101.0 ± 0.6 |
|  | Corn oil | 99.7 ± 0.4 | 100.1 ± 0.4 | 100.0 ± 0.3 | 100.2 ± 0.4 |
|  | ALA-DAG | 99.8 ± 0.2$^{\$\$}$ | 99.5 ± 0.3$^\$$ | 99.3 ± 0.3$^{\#\$}$ | 99.9 ± 0.4 |
| Waist/Hip ratio | Control | 98.9 ± 0.4$^\#$ | 98.9 ± 0.6 | 99.4 ± 0.7 | 98.8 ± 0.8 |
|  | Corn oil | 99.5 ± 0.5 | 99.2 ± 0.5 | 99.7 ± 0.4 | 99.5 ± 0.4 |
|  | ALA-DAG | 99.4 ± 0.3 | 99.2 ± 0.4 | 98.9 ± 0.4$^\#$ | 98.4 ± 0.5$^{\#\#}$ |

Significantly different from control group *0.05
from corn oil group $^\$$p < 0.05, $^{\$\$}$p <0.01
from the value at the start of intake, $^\#$p <0.05, $^{\#\#}$p<0.01

TABLE 11

|  | Group | 4 w | 8 w | 12 w | 16 w |
|---|---|---|---|---|---|
| Skinfold thickness | Control | 85.7 ± 3.9$^\#$ | 81.8 ± 3.3$^{\#\#}$ | 79.8 ± 3.2$^{\#\#}$ | 90.0 ± 5.5 |
|  | Corn oil | 90.3 ± 3.4$^{\#\#}$ | 89.0 ± 3.6$^{\#\#}$ | 88.3 ± 3.4$^{\#\#}$ | 88.9 ± 2.8$^{\#\#}$ |
|  | ALA-DAG | 92.6 ± 3.0$^\#$ | 82.5 ± 2.6$^{\#\#}$ | 82.9 ± 1.7$^{\#\#}$ | 88.5 ± 2.0$^{\#\#}$ |
| Total fat area | Control | 105.3 ± 2.6 | 104.0 ± 3.7 | 110.8 ± 4.6$^\#$ | 107.4 ± 6.0 |
|  | Corn oil | 99.4 ± 2.6 | 101.5 ± 2.2 | 101.5 ± 1.9 | 102.8 ± 1.5 |
|  | ALA-DAG | 91.0 ± 2.2$^{\#\#\$\$*}$ | 89.3 ± 2.4$^{\#\#\$\$**}$ | 92.0 ± 3.0$^{\#\$\$*}$ | 87.7 ± 2.9$^{\#\#\$\$**}$ |
| Visceral fat area | Control | 113.0 ± 4.2$^\#$ | 106.6 ± 4.9 | 123.2 ± 7.7$^{\#\#}$ | 114.1 ± 9.4 |
|  | Corn oil | 105.9 ± 5.7 | 106.3 ± 5.7 | 111.5 ± 5.4 | 110.9 ± 6.6 |
|  | ALA-DAG | 94.1 ± 3.5$^{\$\$}$ | 90.4 ± 3.8$^{\#\$*}$ | 95.5 ± 4.9$^{\$\$*}$ | 90.9 ± 4.3$^{\$*}$ |
| Subcutaneous fat area | Control | 100.6 ± 2.3 | 102.0 ± 3.3 | 103.7 ± 3.7 | 103.7 ± 5.0 |
|  | Corn oil | 96.7 ± 2.6 | 99.6 ± 2.3 | 97.7 ± 1.7 | 99.5 ± 2.0 |
|  | ALA-DAG | 89.1 ± 1.8$^{\#\#}$ | 89.0 ± 2.0$^{\#\#}$ | 90.1 ± 2.7$^{\#\#\#}$ | 86.7 ± 2.6$^{\#\#**}$ |
| Visceral/ subcutaneous fat area ratio | Control | 112.6 ± 3.9$^{\#\#}$ | 104.7 ± 3.7 | 118.6 ± 5.6$^{\#\#}$ | 109.8 ± 6.3 |
|  | Corn oil | 110.8 ± 7.0 | 107.9 ± 7.3 | 115.1 ± 6.6 | 113.4 ± 9.2 |
|  | ALA-DAG | 105.8 ± 3.6 | 101.7 ± 3.8 | 106.6 ± 5.0 | 104.9 ± 4.1 |
| Liver/spleen CT ratio | Control | 95.5 ± 3.5 | 97.7 ± 5.2 | 96.9 ± 3.5 | 97.5 ± 3.3 |
|  | Corn oil | 101.1 ± 5.4 | 103.0 ± 4.7 | 103.2 ± 5.3 | 104.1 ± 5.0 |
|  | ALA-DAG | 97.5 ± 3.0 | 100.4 ± 2.6 | 98.9 ± 2.7 | 97.8 ± 2.9 |

Significantly different from control group *p < 0.05
from corn oil group $^\$$ < 0.05, $^{\$\$}$p < 0.01
from the value at the start of intake, $^\#$p < 0.05, $^{\#\#}$p < 0.01

In the ALA-DAG group, a significant decrease in each of waist circumference, viscera, fat, subcutaneous fat area and total fat area, each relative to the initial value at the test starting time, was recognized throughout 4 weeks to 16 weeks. In the control group, on the other hand, a significant increase (4 and 12 weeks) in. visceral fat area and an increase in a visceral/subcutaneous fat area (V/S ratio) caused thereby, each relative try the initial value at the test starting time were recognized.

A decrease in the subcutaneous fat area in the ALA-DAG group is significant compared with that in the control group and at the same time, a decrease in each of visceral fat area and total fat area is significant compared with the control group and corn oil group.

These results suggest that the replacement of a part of milk fat originally contained in a milk tea with ALA-DAG facilitates intake of the milk tea in daily life and at the same time, in the ALA-DAG group, the visceral fat area, subcutaneous fat area and their total fat area were recognized to exhibit a significant decrease compared with those at the initial stage of the test.

Obviously, numerous modifications and variations of the present invention are possible in light of the above teachings. It is therefore to be understood that within the scope of the appended claims, the invention may be practiced otherwise than as specifically described herein.

This application is based on Japanese patent applications 2001-87241 and 2002-8884 filed in the Japanese Patent Office on Mar. 26, 2001 and Jan. 17, 2002 the entire contents of each of which are hereby incorporated by reference.

What is claimed is:

1. A packaged emulsified beverage, which comprises:
   component (A) comprising a diglyceride having, as a fatty acid constituent thereof 15 to 90 wt. % of an ω3-unsaturated fatty acid, and
   component (B): a lipid selected from the group consisting of phospholipids, lypoproteins and a mixture thereof.

2. The packaged emulsified beverage of claim 1, which comprises 0.1 to 8 wt. % of said diglyceride.

3. The packaged emulsified beverage of claim 1, wherein said ω3-unsaturated fatty acid has 12 to 24 carbon atoms.

4. The packaged emulsified beverage of claim 1, wherein said ω3-unsaturated fatty acid is selected from the group consisting of α-linolenic acid, docosahexaenoic acid, eicosapentaenoic acid and a mixture thereof.

5. The packaged emulsified beverage of claim 1, wherein said ω3-unsaturated fatty acid is α-linolenic acid.

6. The packaged emulsified beverage of claim 1, wherein Component (A) is comprised of at least 50 wt. % of unsaturated fatty acids of all fatty acid constituents.

7. The packaged emulsified beverage of claim 1, wherein said diglyceride comprises 30 wt. % or more of a total oil/fat of said emulsified beverage.

8. The packaged emulsified beverage of claim 1, wherein component (A) comprises 0.1 to 74.9 wt % of triglycerides, 25 to 95 wt. % of diglycerides and 0.1 to 5 wt. % of monoglycerides.

9. The packaged emulsified beverage of claim 1, wherein component (A) comprises 5 to 59.9 wt. % of triglycerides, 25 to 90 wt. % of diglycerides and 0.1 to 5 wt. % of monoglycerides.

10. The packaged emulsified beverage of claim 1, wherein component (A) comprises 5 to 49.9 wt. % of triglycerides, 50 to 90 wt. % of diglycerides and 0.1 to 5 wt. % of monoglycerides.

11. The packaged emulsified beverage of claim 1, comprising 0.1 to 8 wt. % of component (A).

12. The packaged emulsified beverage of claim 1, comprising 0.1 to 10 wt. % of component (A).

13. The packaged emulsified beverage of claim 1, wherein component (B) is selected from the group consisting of diglyceride-3-phosphoric acid, derivatives of diglyceride-3-phosphoric acid, monoglyceride-3-phosphoric acid, derivatives of monoglyceride-3-phosphoric acid, ceramide-1-phosphoric acid, derivatives of ceramide-1-phosphoric acid, and mixtures comprising at least one of ceramide-1-phosphoric acid, derivatives of ceramide-1-phosphoric acid.

14. The packaged emulsified beverage of claim 1, wherein component (B) is selected from the group consisting of phosphatidylcholine, phosphatidylserine, phoaphatidylinositol, phosphatidylethanolamine, phosphatidyl-N-methylethanolamine, and phosphatidyl-N,N-dimethylethanolanmine and these components in the lyso form, sphingomyelin, ceramide phosphorylethanolamine, ceramide phosphoryl glycerol, lecithin, lysolecithin and a mixture thereof.

15. The packaged emulsified beverage of claim 1, comprising 0.01 to 0.5 wt. % of component (B).

16. The packaged emulsified beverage of claim 1, wherein said phospholipid is lecithin or lysolecithin.

17. The packaged emulsified beverage of claim 1, further comprising a package which is hermetically sealed.

18. The packaged emulsified beverage of claim 1, wherein said beverage is a beverage selected from the group consisting of milk tea, milk coffee or a processed milk product.

19. A method for preparing a packaged emulsified beverage comprising:
   i) packaging an emulsified beverage, which comprises:
      component (A): comprising a diglyceride having, as a fatty acid constituent thereof 15–90 wt % of an ω3-unsaturated fatty acid, and
      component (B): a lipid selected from the group consisting of phospholipids, lipoproteins and a mixture thereof; and
   ii) sterilizing the emulsified beverage packaged in step i).

* * * * *